United States Patent
Kim

(10) Patent No.: US 7,945,687 B2
(45) Date of Patent: May 17, 2011

(54) METHOD AND APPARATUS FOR CONTROLLING DATABASE IN MOBILE COMMUNICATION TERMINAL

(75) Inventor: Mi Su Kim, Gyeongsangbuk-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 449 days.

(21) Appl. No.: 11/823,147

(22) Filed: Jun. 26, 2007

(65) Prior Publication Data

US 2008/0086481 A1  Apr. 10, 2008

(30) Foreign Application Priority Data

Oct. 9, 2006 (KR) .................. 10-2006-0097819

(51) Int. Cl.
   *G06F 15/16* (2006.01)
   *G06F 15/173* (2006.01)
(52) U.S. Cl. ......... 709/230; 709/203; 709/223; 709/224
(58) Field of Classification Search .................. 710/104; 707/104.1; 709/203, 223, 224, 230, 231, 709/232

See application file for complete search history.

(56) References Cited

U.S. PATENT DOCUMENTS

| 2005/0065976 | A1  | 3/2005  | Holm et al. |
| 2005/0201254 | A1* | 9/2005  | Looney et al. ............ 369/124.01 |
| 2006/0212148 | A1  | 9/2006  | Fitzgerald et al. |
| 2007/0204089 | A1* | 8/2007  | Proctor ......................... 710/301 |
| 2007/0294292 | A1* | 12/2007 | Hydrie et al. .............. 707/104.1 |

FOREIGN PATENT DOCUMENTS

| CN | 1476613    | 2/2004 |
| KR | 2006-56704 | 5/2006 |

* cited by examiner

*Primary Examiner* — Quang N. Nguyen
(74) *Attorney, Agent, or Firm* — Cha & Reiter, LLC

(57) ABSTRACT

A method and apparatus for controlling a database of a mobile communication terminal that can automatically store information about a content file by downloading and storing the content file through an external network; extracting information about the stored content file; and adding information about the extracted content file to the database, wherein even through a content file is downloaded and stored through a protocol other than a MTP, a record of the content file can automatically be added to the database, thus allowing the management of content files using one database.

10 Claims, 3 Drawing Sheets

FIG. 2

| NUMBER | FORMAT | TITLE | ARTIST | DURATION(S) | FILENAME | ALBUM | TRACK | GENRE |
|---|---|---|---|---|---|---|---|---|
| 0001 | WMA | title1 | artist1 | 180 | Song1.wma | album1 | 01 | Rock |
| 0002 | WMA | title2 | artist1 | 200 | Song2.wma | album1 | 03 | Rock |
| 0003 | MP3 | title3 | artist2 | 254 | Song3.mp3 | album2 | 06 | Gospel |
| 0004 | WMV | title4 | artist3 | 3600 | mov1.wmv | | | |

FIG. 3

| NUMBER | FORMAT | TITLE | ARTIST | DURATION(S) | FILENAME | ALBUM | TRACK | GENRE |
|---|---|---|---|---|---|---|---|---|
| 0001 | WMA | title1 | artist1 | 180 | Song1.wma | album1 | 01 | Rock |
| 0002 | WMA | title2 | artist1 | 200 | Song2.wma | album1 | 03 | Rock |
| 0003 | MP3 | title3 | artist2 | 254 | Song3.mp3 | album2 | 06 | Gospel |
| 0004 | WMV | title4 | artist3 | 3600 | mov1.wmv | | | |
| 0005 | MP3 | title5 | artist4 | 339 | Song5.mp3 | album5 | 05 | Pop |

METHOD AND APPARATUS FOR CONTROLLING DATABASE IN MOBILE COMMUNICATION TERMINAL

CLAIMS OF PRIORITY

This application claims priority to an application entitled "METHOD AND APPARATUS FOR CONTROLLING DATABASE IN MOBILE COMMUNICATION TERMINAL," filed in the Korean Intellectual Property Office on Oct. 9, 2006 and assigned Serial No. 2006-0097819, the contents of which are incorporated herein by reference.

BACKGROUND OF THE INVENTION

1. Field of the Invention

The present invention relates to a mobile communication terminal, and more particularly, to a method and apparatus for automatically storing information about a content file in a mobile communication terminal.

2. Description of the Related Art

Nowadays, a mobile communication terminal performs various functions such as image communication, an electronic notebook function, a voice or image storage function, an Internet search function, an entertainment function, and a content play function, in addition to the conventional voice communication and short message transmission. As the mobile communication terminal performs various functions, the amount of data files (hereinafter, a content file) used for various functions increase.

The content files can be stored within the mobile communication terminal through various methods. For example, the content files can be acquired by connecting to the wireless Internet through a Wireless Application Protocol (WAP) or wireless local area network (LAN), etc. or be acquired by connecting to another terminal through Bluetooth or Infrared Data Association (IrDA) connection. A method of acquiring a content file by connecting to a personal computer (hereinafter, PC) using a wired connection is typically used.

The modern mobile communication terminal generally uses a Media Transfer Protocol (MTP, a data communication protocol from the Microsoft company) in order to mutually exchange a file by connecting to the PC through a wire.

The MTP is used for exchanging data including the content file. When the mobile communication terminal supporting the MTP is connected to the PC, the PC and mobile communication terminal are immediately synchronized without a separate hardware recognition process. When the mobile communication terminal is connected to the PC through the MTP, information about content files transmitted to the mobile communication terminal is automatically stored in a database within the mobile communication terminal according to the MTP.

However, when a conventional mobile communication terminal stores a content file in the mobile communication terminal through other methods, e.g. wireless Internet, local area wireless communication, or Mass Storage Class (MSC), except the MTP, information about the stored content file is not added to the database.

Accordingly, the user must separately manage and use content files stored within the mobile communication terminal through the MTP and content files stored through other methods.

SUMMARY OF THE INVENTION

The present invention has been made in an effort to solve the above problems and provides additional advantages, by providing a method and apparatus for automatically storing information about a content file in the database of a mobile communication terminal using other protocols, except a Media Transfer Protocol (MTP).

In accordance with an aspect of the present invention, a method of controlling a database in a mobile communication terminal includes: downloading and storing a content file through an external network; extracting information about the stored content file; and adding information about the extracted content file to the database.

In accordance with another aspect of the present invention, an apparatus for controlling a database in a mobile communication terminal includes: a storage unit for including a database for an MTP and storing a content file downloaded from an external network; a data extraction unit for extracting information about the content file stored in the storage unit when the external network is a network connected through a protocol other than the MTP; and a database updating unit for adding the information about the content file extracted from the data extraction unit to the database for the MTP.

BRIEF DESCRIPTION OF THE DRAWINGS

The above features and advantages of the present invention will be more apparent from the following detailed description in conjunction with the accompanying drawings, in which:

FIGS. 2 and 3 are tables schematically illustrating a database structure according to an exemplary embodiment of the present invention.

DETAILED DESCRIPTION OF THE INVENTION

Now, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

It should be noted that contents described in the context of present invention represent digital contents (DC) and are materials and information manufactured or processed in an electronic form by coupling a material, information, knowledge, and database, which are represented with a symbol, character, voice, sound, image, etc., to information technology (IT). Particularly, the contents are digital contents that are used in the mobile communication terminal through an information communication network.

Further, an external network described in the context of present invention includes the Internet, a network with at least one terminal or coupled to another terminal by one-to-one connection. If the external network to which the mobile communication terminal is connected is the Internet, the mobile communication terminal can be connected to an external network through a Wireless Application Protocol (WAP), a wireless LAN, etc. If the external network to which the mobile communication terminal is connected is a network having other terminals, the mobile communication terminal can be connected to the network using a wireless LAN or local area wireless communication (e.g. bluetooth or IrDA). If the mobile communication terminal connects to another terminal by one-to-one connection, the mobile communication terminal can be connected to another terminal through local area wireless communication or wired communication means (e.g. Universal Serial Bus (USB)).

Figure 1:
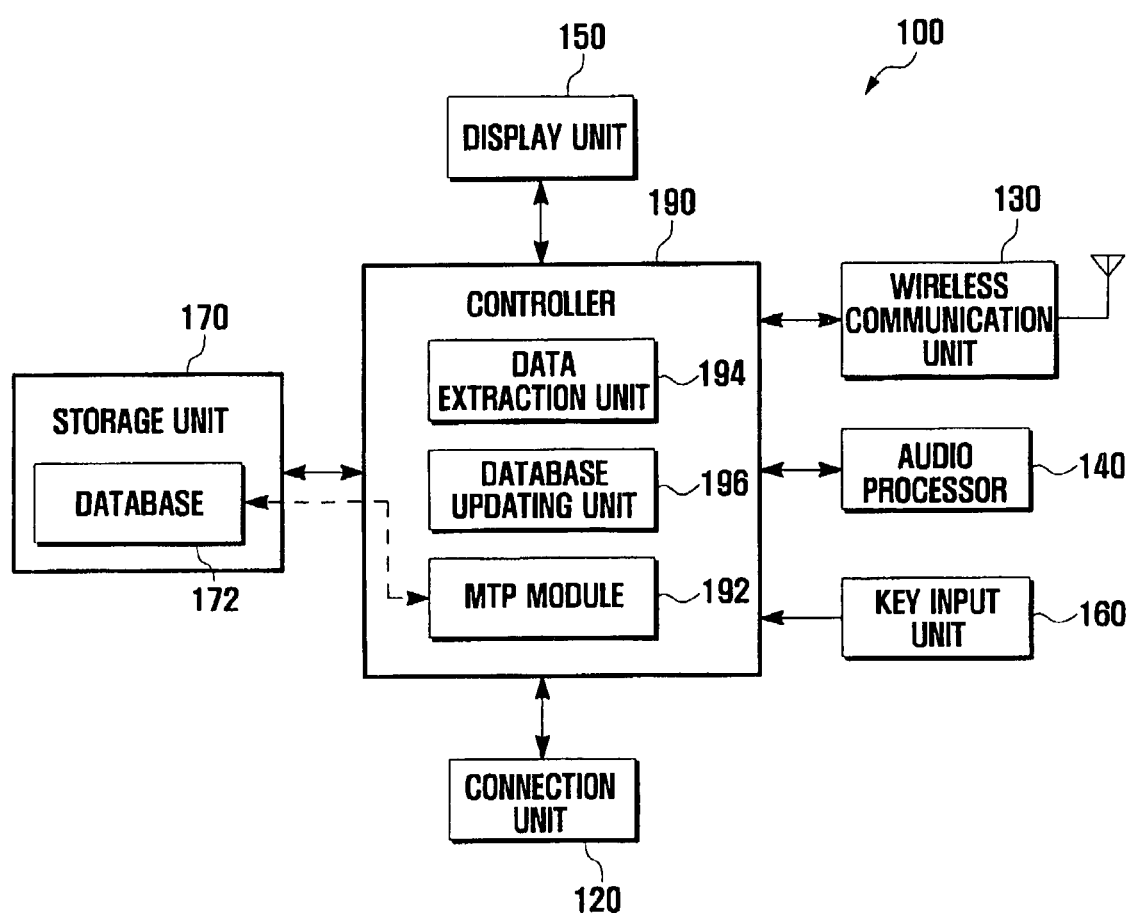
FIG. 1 is a block diagram illustrating a configuration of a mobile communication terminal according to an exemplary embodiment of the present invention.

FIG. 1 is a block diagram illustrating a configuration of a mobile communication terminal according to an exemplary embodiment of the present invention.

Referring to FIG. 1, the mobile communication terminal 100 includes a wireless communication unit 130, audio processor 140, key input unit 160, display unit 150, storage unit 170, controller 190, and connection unit 120.

The wireless communication unit 130 performs the wireless communication of the mobile communication terminal 100 and includes a radio frequency (RF) transmitter (not shown) for up-converting a frequency of a signal to be transmitted and amplifying the signal, and an RF receiver (not shown) for low-noise amplifying a received signal and down-converting a frequency thereof. The wireless communication unit 130 receives data through a wireless channel and outputs the data to the controller 190, and also receives data from the controller 190, for example image data and broadcasting data, for transmission and transmits the data through a wireless channel. Further, the wireless communications unit 130 may include a local area communication unit (not shown) having a bluetooth communication module or infrared transceiver.

The audio processor 140 includes a codec (coder/decoder) that includes a data codec for processing packet data and an audio codec for processing an audio signal such as a voice. The audio processor 140 converts digital audio data received by the controller 190 through the wireless communication unit 130 to an analog audio signal using the audio codec and plays the signal through a speaker SPK (not shown), and converts an analog audio signal input through a microphone MIC (not shown) to digital audio data using the audio codec and provides the data to the controller 190.

The key input unit 160 receives a user's manipulation signal for controlling the mobile communication terminal 100 and transfers the signal to the controller 190. The key input unit 160 includes a control key (not shown) for controlling the operation of the mobile communication terminal 100 and a plurality of numeral and character keys (not shown) for inputting numerals and characters.

The display unit 150 may be a Liquid Crystal Display (LCD) and includes an LCD controller, a memory for storing data, and an LCD display element. When the LCD is embodied with a touch screen type, the screen of the display unit 150 can be used as an input unit.

The storage unit 170 includes a program memory and a data memory. In the program memory, programs for controlling the general operation of the mobile communication terminal 100 are stored. In the data memory, data generated while executing programs are stored. Further, in the data memory, content files transmitted from an external network are stored. When the content file is newly stored or erased, the data memory includes a database 172 for adding or erasing information relating to the content file. A schematic structure of the database 172 is shown in FIGS. 2 and 3.

Referring to FIG. 2, the database 172 according to the present embodiment includes a plurality of fields, i.e. a number, format, title, artist, duration, filename, album, track, and genre. However, the database 172 is not limited to the fields described herein, but the fields can be added, changed, or erased, if necessary.

Referring back to FIG. 1, the controller 190 performs the entire control operation of the mobile communication terminal 100. When the mobile communication terminal 100 is connected to a PC through an MTP, the controller 190 synchronizes the database of the PC with the database 172 of the storage unit 170. Further, when the content file is stored in the storage unit 170 through a protocol other than the MTP, the controller 190 adds information about the corresponding content file to the database 172. To this end, the controller 190 includes an MTP module 192, data extraction unit 194, and database updating unit 196.

When the mobile communication terminal 100 is connected to the PC through the MTP, the MTP module 192 controls the content files for mutual transmissions between the mobile communication terminal 100 and the PC, and stores the information relating to the content files in the database 172.

The data extraction unit 194 and the database updating unit 196 operate only when the mobile communication terminal 100 is connected to an external network through a protocol other than the MTP.

The data extraction unit 194 extracts information relating to the content file downloaded from the external network and stored in the storage unit 170. The data extraction unit 194 extracts the general file information (filename, format, file size, etc.) and data from an ID3 tag which the content file has. However, extraction of data is not limited thereto and information may be extracted from a header part of the content file.

The database updating unit 196 adds or records about the content file to the database 172 using data extracted from the data extraction unit 194.

The connection unit 120 includes a USB controller and is connected to the PC through a wire cable.

Figure 4:
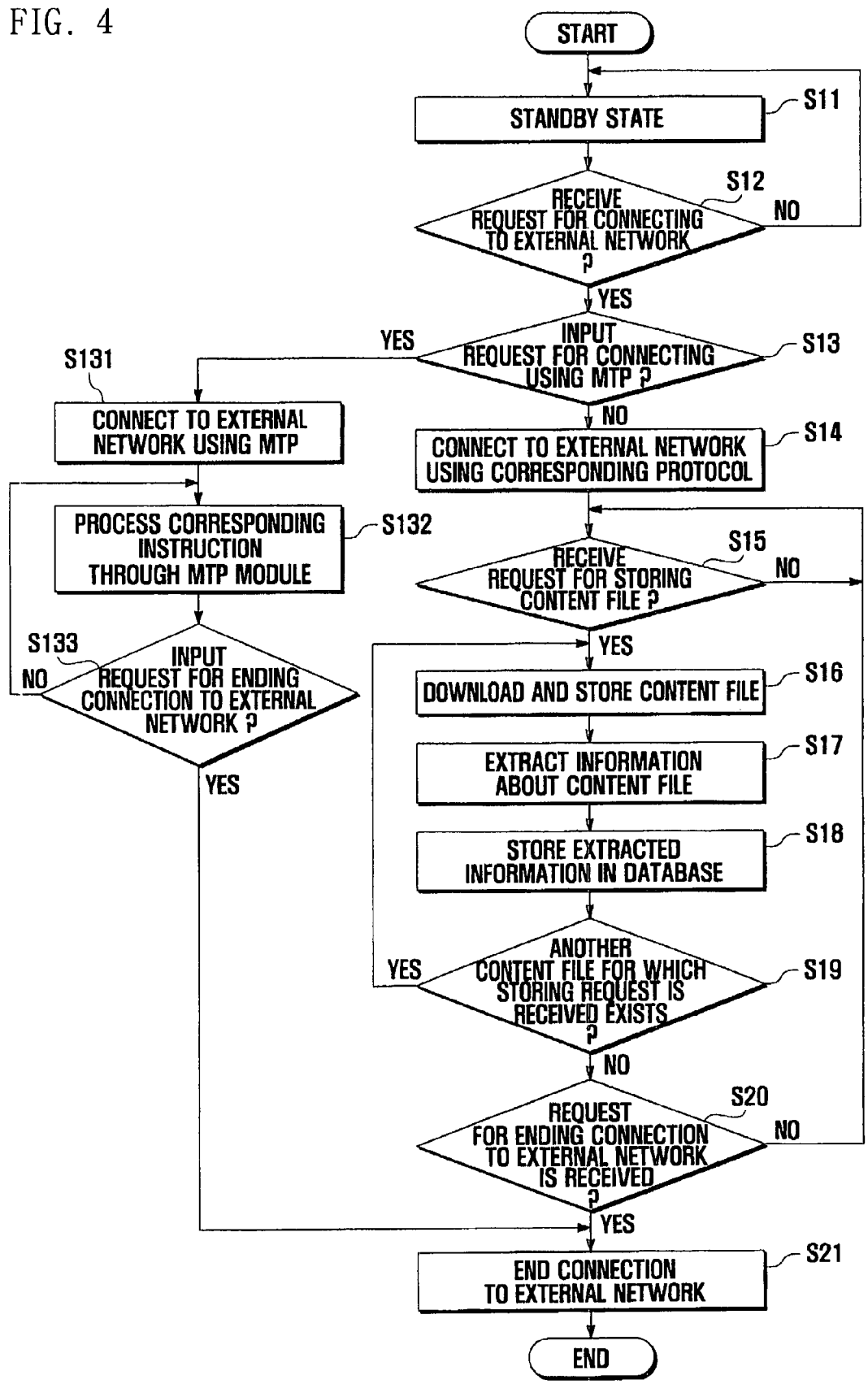
FIG. 4 is a flowchart illustrating a method of controlling a database according to an exemplary embodiment of the present invention.

FIG. 4 is a flowchart illustrating a method of controlling a database according to an exemplary embodiment of the present invention.

The mobile communication terminal 100 is in a standby state (S11). In the present embodiment, the standby state is a state in which the mobile communication terminal 100 is not connected to an external network for communication or data transmission.

When a user connects the mobile communication terminal 100 to an external network (e.g. Internet or another terminal such as a PC), the user inputs a request for connecting to the Internet or another terminal by sequentially manipulating the input interface/menus. Accordingly, the controller 190 receives the request for connecting to the external network (S12). When the user connects the mobile communication terminal 100 to another terminal through a wired connection, the controller 190 receives the request for connecting to the external network through a signal transmitted from the connection unit 120.

Next, the controller 190 determines whether the request for connecting to the external network is a request for connecting using an MTP (S13).

If the request for connecting to the external network is a request for connecting using an MTP, the controller 190 is connected to the external network using the MTP (S131).

If the mobile communication terminal 100 connects to the PC through the MTP, the controller 190 transfers the entire control responsibility for signals transmitted from the PC to the MTP module 192. Accordingly, the MTP module 192 directly receives entire signals input through the connection unit 120 and sequentially processes instructions corresponding to the received signals (S132). In this process, the MTP module 192 stores content files transmitted from the PC in the storage unit 170 or erases and stores the information in the database 172. A process of processing the file through the MTP module 192 and a process of updating the database 172 are already well-known and thus descriptions thereof will be omitted.

Next, in a state where the mobile communication terminal 100 is connected to the external network by the MTP, if a request for ending the connection to the external network is input by the user (S133), the controller 190 receives the control responsibility from the MTP module 192, enters step S21, and ends the connection to the external network.

If the request for connecting to the external network is a request for connecting using other protocol, not the MTP, the controller 190 connects to the external network using the corresponding protocol (S14), so that the user can use the external network through the mobile communication terminal 100.

In a state where the mobile communication terminal 100 is connected to the external network, i.e. Internet or another terminal, if the user selects a content file (hereinafter, Song5.mp3) to download the controller 190 receives a request for storing the content file (S15). The controller 190 downloads the selected Song5.mp3 file and stores the file in the storage unit 170 (S16). The user can simultaneously select a plurality of content files and request to store the files. In this case, the controller 190 first downloads and stores any one content file and performs the following process.

If storage of the Song5.mp3 file is completed, a data extraction unit 194 of the controller 190 extracts information about the Song5.mp3 file stored in the storage unit 170 (S17). In the present embodiment, data such as a filename, format, size, duration are extracted. Additionally, data such as a title, artist, album, track, and genre, which are stored in an ID3 tag of the content file, are extracted. However, the data are not limited thereto, various methods such as a method of extracting the stored data by parsing a header part of the content file can be used.

If information about the Song5.mp3 file is extracted through such a method, the database updating unit 196 of the controller 190 stores the extracted data in the database 172 (S18). That is, the database updating unit 196 transmits a record addition instruction of the database 172 and data of the Song5.mp3 file extracted at step S17 to the MTP module 192. Accordingly, the MTP module 192 adds a record of the Song5.mp3 file to the database 172 using the data received from the database updating unit 196. The record of a control number 0005 as in FIG. 3 is added to the database 172 in a state of FIG. 2.

If the record of the Song5.mp3 file stored in the storage unit 170 is added to the database 172 through the above described process, the controller 190 determines whether another content file for which a request for storing is input by the user exists (S19). That is, when the user simultaneously selects a plurality of content files and requests to store the files at step S15, the controller 190 determines whether another content file to store in addition to the Song5.mp3 file stored in the storage unit 170 exists.

If another content file in which a request for storing is input by the user exists, the controller 190 downloads and stores the corresponding content file by returning to step S16, and then repeatedly executes the process up to step S18.

If another content file in which a request for storing is input by the user does not exist, the controller 190 determines whether a request for ending the connection is input by the user (S20). When the user does not end the connection and continuously use the external network, the controller 190 repeatedly executes the process of steps S14 to S19 by returning to step S14.

However, if a request for ending the connection is input by the user, the controller 190 ends the connection to the external network (S21) and returns to a standby state.

As described above, in the present invention, even though a content file is stored through another protocol, and not the MTP, a record of the content file can be automatically added to the database 172. Accordingly, content files stored through the MTP and content files stored through another protocol except the MTP can be managed in a bundle using one database 172.

In the described exemplary embodiment, for example, when the mobile communication terminal 100 is connected to a PC using the MTP, a method of controlling the database 172 in the mobile communication terminal 100 in which the database 172 is automatically updated is described. However, the present invention is not limited thereto, and the present invention can variously be applied to a case where the database 172 is automatically updated by only a specific protocol or program.

Further, in the described exemplary embodiments, a method of controlling a database executed in the mobile communication terminal 100 is exemplified. However, the present invention can variously be applied to electronic appliances having a database. Also, various elements and portions of the drawings are exemplified and thus the present invention is not limited to a relative size or space of those shown in the drawings.

As described above, when a content file is downloaded and stored through a protocol except an MTP using a method and apparatus of controlling a database in a mobile communication terminal according to the present invention, a record of a content file can automatically be added to the database. Therefore, the content files stored through the MTP and content files stored through a protocol other than the MTP can be managed in a bundle using one database.

Although exemplary embodiments of the present invention have been described in detail hereinabove, it should be clearly understood that many variations and modifications of the basic inventive concepts herein taught that may appear to those skilled in the present art will still fall within the spirit and scope of the present invention, as defined in the appended claims.

What is claimed is:

1. A method of controlling a database for a Media Transfer Protocol (MTP) of a mobile communication terminal, comprising:
    downloading and storing at least one content file from an external network coupled through the MTP and at least one protocol other than the MTP (non-MTP);
    extracting information only relating to a content file downloaded through the at least one non-MTP among the at least one stored content file after the step of download and storing the at least one content file downloaded from the external network coupled through the MTP and the at least one non-MTP; and
    updating the extracted information only relating to the content file downloaded through the at least one non-MTP to the database for the MTP to manage the at least one stored content file downloaded through both the MTP and the at least one non-MTP in a bundle after the step of extracting information only relating to the content file downloaded through the at least one non-MTP,
    wherein the extracting step and the updating step operate only when the mobile communication terminal is coupled to the external network through the at least one non-MTP.

2. The method of claim 1, wherein storing the at least one content file comprises:
    connecting to the external network;

receiving a request for storing at least one the content file through the connected external network; and downloading and storing the at least one content file according to the request for storing the content file.

3. The method of claim 1, wherein the non-MTP comprises any protocols for wired and wireless connection that are used when connecting to the Internet or when connecting to another terminal.

4. The method of claim 3, wherein connecting to another terminal is achieved via a Bluetooth or Infrared Data Association (IrDA) connection.

5. The method of claim 4, wherein the data comprise a title, artist, album, track, and genre.

6. The method of claim 1, wherein the external network comprises a wireless Internet or a wireless local area network (LAN).

7. The method of claim 1, wherein the information extracted from the stored content file comprises data stored in an ID3 tag.

8. The method of claim 1, wherein the information extracted from the stored content file comprises information stored in a header part of the content file.

9. An apparatus for controlling a database for a Media Transfer Protocol (MTP) of a mobile communication terminal, comprising:

a storage unit storing at least one content file downloaded from an external network coupled through the MTP and at least one protocol other than the MTP (non-MTP) and having the database for the MTP;

a data extraction unit extracting information only relating to a content file downloaded through the at least one non-MTP among the at least one stored content file after the storing unit stores the at least one content file downloaded from the external network coupled through the MTP and the at least one non-MTP; and a database updating unit adding the information only relating to the content file extracted from the data extraction unit to the database for the MTP to manage the at least one stored content file downloaded through both the MTP and the at least one non-MTP in a bundle after the data extraction unit extracts the information only relating to the content file downloaded through the at least one non-MTP, wherein the data extraction unit and the database updating unit operate only when the mobile communication terminal is coupled to the external network through the at least one non-MTP.

10. The apparatus of claim 9, wherein the information extracted from the at least one stored content file comprises data stored in an ID3 tag.

\* \* \* \* \*